Nov. 25, 1958 S. W. H. PERRY 2,861,823
BLADED ROTORS FOR COMPRESSORS, TURBINES AND THE LIKE
Filed Nov. 8, 1954 2 Sheets-Sheet 2

# United States Patent Office 2,861,823
Patented Nov. 25, 1958

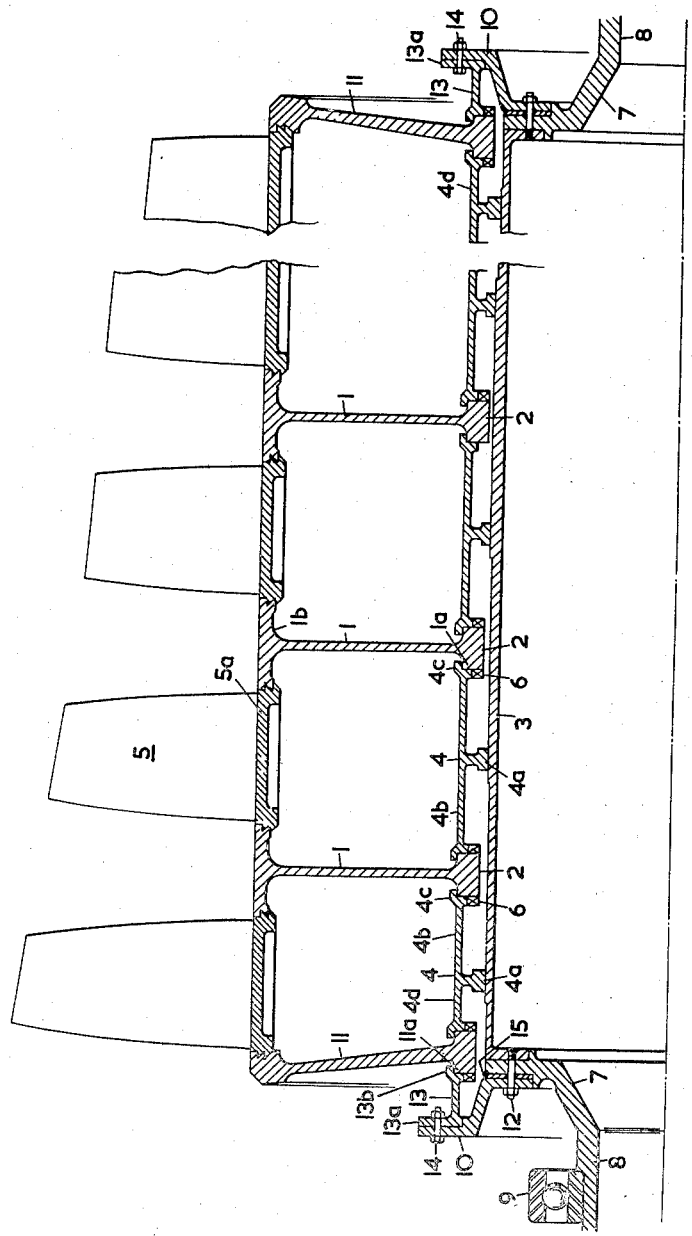

2,861,823

BLADED ROTORS FOR COMPRESSORS, TURBINES AND THE LIKE

Sydney William Henry Perry, Cove, Farnborough, England, assignor to Power Jets (Research and Development) Limited, London, England, a British company Application November 8, 1954, Serial No. 467,562

Claims priority, application Great Britain
December 24, 1953

8 Claims. (Cl. 287—52)

This invention relates to rotors for axial flow compressors, turbines and like bladed fluid flow machines of the type comprising a plurality of blade carrying rotor discs having axial bores through which extends a common shaft.

One way of centering such discs relative to one another is to mount them directly on the shaft with an interference fit therewith. The discs are thus pre-stressed to resist centrifugal deformation so that the fit may be maintained at high rotational speeds and the discs may remain centered relative to one another. However, unless the fit is a heavy one and the discs are of massive construction, there is still a risk that the discs may become loose on the shaft. This risk is accentuated in gas or steam turbine rotors where the discs may become considerably hotter than the shaft and so expand relative thereto. The present invention accordingly provides an alternative construction to that described above in which there is a reduced risk of non-concentricity of the discs and shaft arising during running.

According to the present invention, a rotor for an axial flow compressor turbine or like bladed fluid flow machine comprises at least two coaxial axially spaced blade-carrying rotor discs having axial bores through which a shaft extends with radial clearance, and an elongated sleeve between the discs coaxially surrounding the shaft, said sleeve having intermediate its ends a radially thickened portion which is capable of substantially resisting radial expansion under centrifugal loading with an axial bore in which the shaft is an interference fit, and thin-walled tubular axial extensions from each side of the thickened portion, surrounding the shaft with radial clearance and having their ends formed with sockets in which engage axially extending central spigots on the adjacent faces of the discs, the extensions and sockets being elastically deformable in a radial sense to permit radial expansion of the discs and their spigots.

The thickened portion may be of such radial dimensions as to be capable of substantially resisting radial expansion under centrifugal loading.

The invention will now be more fully described with reference to the accompanying drawings of which:

Figure 1 is an axial half-section of a six-stage axial flow compressor rotor, some of the stages being partially broken away.

Figure 3:
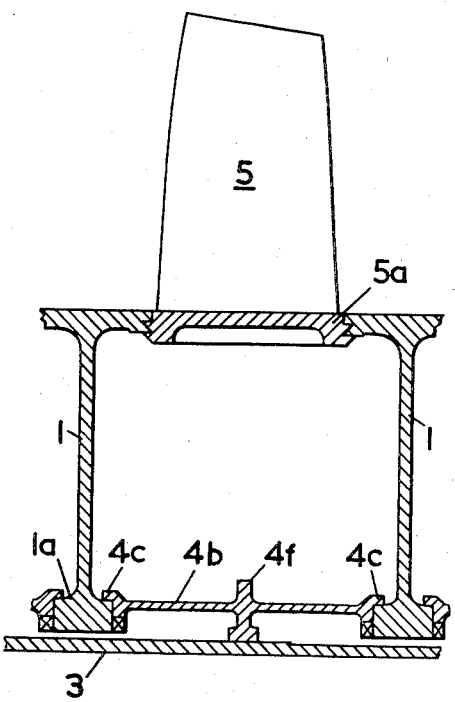
Figure 3 is a fragmentary axial section of a modification of the rotor illustrated in Figure 1.

In Figure 1, the rotor comprises a number of coaxial, axially spaced rotor discs 1 having axial bores 2 through which a hollow shaft 3 extends with a radial clearance. In practice this clearance is quite small, being of the order of .010 to .030 inch, but is somewhat exaggerated in the drawing for the sake of clarity.

Between each adjacent pair of rotor discs 1, there is an elongated spacing sleeve 4 coaxially surrounding the shaft 3. Each sleeve has intermediate its ends a radially thickened portion 4a having an axial bore in which the shaft 3 engages with an interference fit. From each side of the enlarged portion 4a, there is a thin-walled axial tubular extension 4b surrounding the shaft with a radial clearance, and the ends of these extensions 4b are formed with cylindrical sockets 4c. The hub portions of the discs 1 are axially enlarged to form central cylindrical spigots 1a which extend axially from the disc faces and engage in the sockets 4c with an interference fit. The sockets 4c and the spigots 1a are further formed with interengaging driving dogs 6 as will be explained below.

The rotor carries rows of blades 5 which are secured to the discs 1 generally in the manner described in British patent specification No. 632,923. The discs 1 are formed with axially extending peripheral flanges 1b between which are located the roots 5a of the rows of rotor blades 5. The blade roots 5a and the edges of the disc flanges 1b are formed with circumferentially extending interengaging serrations whereby the blades are retained against the centrifugal loads thereon. However any other construction for mounting the blades might be used. For example, the blades could be formed with fir-tree or other roots engaging in corresponding seatings in the rotor disc peripheries, and shroud rings could be provided to make up the surface of the rotor between the blade rows.

In operation, the discs 1, being comparatively thin, will tend to expand radially at high rotational speeds under the action of centrifugal loading, but since they are loose on the shaft 3 under all conditions their location is not affected thereby. The thickened portions 4a of the sleeves on the other hand are of small radial dimensions relative to the discs so that they are able to resist the centrifugal loading and do not expand radially to any substantial extent, any expansion which does occur being less than the interference between the bores of the thickened portions 4a and the shaft 3. Accordingly the sleeves 4 remain centered on the shaft under all running conditions. The extensions 4b and the sockets 4c are comparatively thin-walled and are of sufficient length to permit them to elastically deform radially, i. e. they will bell out at their ends to allow for radial expansion of the discs 1 and their spigots 1a. Thus the rotor discs can be maintained concentric with the shaft under all running conditions.

The shaft 3 is attached at its ends to bearer members 7 which are integral with stub shafts 8 for supporting the rotor in bearings 9. Also rigidly attached to the ends of shaft are radially outwardly extending annular brackets 10 lying beyond the end discs 11 of the rotor. These brackets 10 and the stub shafts 7 are attached to the shaft by means of studs and nuts 12. Between each bracket 10 and the outer face of the adjacent end disc 11 there is a further thin-walled sleeve 13 coaxial with the shaft 3. This sleeve is provided at one end with a radially extending flange 13a rigidly attached, e. g. by nuts and bolts 14, or by riveting or welding, to the bracket 10, and at the other end with a socket 13b into which fits a cylindrical axially extending spigot 11a formed on the outer surface of the end disc 11. The socket 13b and spigot 11a are further provided with interengaging driving dogs 6 in the same way as the sockets 4c and the spigots 1a.

As already pointed out, the sleeves 13 are thin-walled and they are of sufficient length to allow for radial expansion of the end discs 11 by elastic deformation. Thus they act in the same way as the extensions 4b of the sleeves 4.

Figure 2:
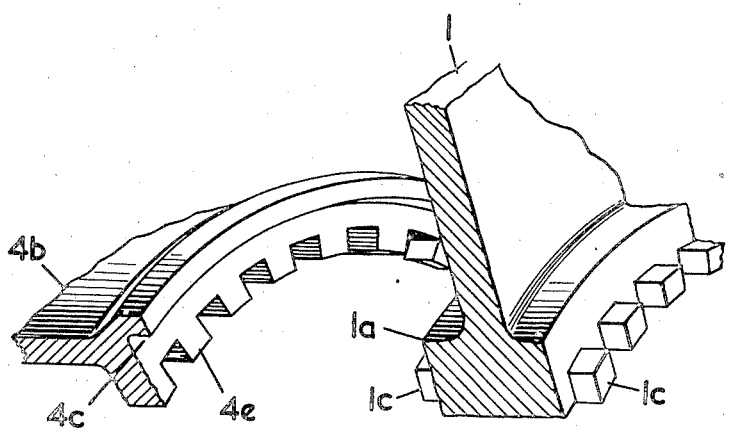
Figure 2 is a fragmentary perspective view of a detail of the rotor illustrated in Figure 1.

The construction of the driving dogs 6 shown diagrammatically in Figure 1 is illustrated in Figure 2. The faces of the spigots 1a are formed with axially projecting teeth 1c which engage with corresponding teeth 4e formed on ends of the extensions 4c radially within the sockets.

In operation, the drive is transmitted from the shaft 3 to the annular brackets 10 and thence through the sleeves 13 to the discs and the sleeves 4. In order to avoid excessive loading on either of the sleeves 13, the driving dogs are omitted on one side of one of the discs 1 intermediate the ends of the rotor as near as possible the mid-length thereof. In Figure 1 there are no driving dogs on the left hand side of the central disc, i. e. the disc between the third and fourth row of rotor blades 5. Thus the left hand three rotor discs are driven from the left hand end of the shaft, while the remaining four discs are driven from the right hand end.

In a rotor of the type illustrated but having an odd number of stages, the driving dogs on the adjacent faces of the discs supporting the middle row of rotor blades may both be omitted.

Shims 15 are inserted between the ends of the shaft 3 and the brackets 10. The thickness of these shims is so selected that the rotor discs 1 and sleeves 4 are positively clamped together. To ensure this condition, the blade roots 5a are slightly loose in their seatings and accordingly means are provided affording a torque-transmitting connection between the disc peripheries and the blade roots, e. g. pegs on the blade roots engaging in holes in the disc peripheries as described in said British patent specification No. 632,923. The peripheries of the end discs 11 are belled outwardly to some extent so that at high rotational speeds they will tend to straighten up and clamp the blades more tightly.

In the embodiment illustrated in Figure 1, the outer surfaces of the sleeves 4 are of constant diameter intermediate their ends. If necessary however the thickened portions of the sleeves may be extended radially outwardly of the extension 4b as indicated at 4f in Figure 3. The radial dimension of the thickened portions will however still be small compared with the discs so that there will be no substantial centrifugal growth under centrifugal loading.

To facilitate assembly of the rotor, the shaft 3 is stepped, having its greatest diameter at its mid-length. There is a step immediately on that side of each thickened portion 4a of the sleeve towards the nearer end of the shaft, so that the sleeve only has to be forced on to the shaft for a short distance. In practice these steps are quite small, e. g. of the order of .010 inch, but in the drawing they are somewhat exaggerated for the sake of clarity.

The blades 5 may be of integral construction, e. g. machined, forged, cast or rolled, or they may comprise separate blade and root portions, for example, as described in any one of copending British patent applications Nos. 13.773/52, 18.952/53, 26,974/52. and 15,406/53.

The present invention has application to turbines as well as compressors. In its application to a gas or stream turbine operating at high temperature the construction described permits thermal expansion of the rotor discs relative to the sleeves 4 as well as centrifugal growth.

I claim:

1. A rotor for an axial flow compressor, turbine, or like bladed fluid flow machine comprising a shaft; at least two coaxial axially spaced blade-carrying rotor discs having axial bores through which the shaft extends with radial clearance, the discs being formed with axially extending central spigots on their adjacent faces; an elongated sleeve between the discs coaxially surrounding the shaft, said sleeve having intermediate its ends a radially thickened portion with an axial bore engaging with the shaft, and thin-walled tubular axial extensions from each side of the thickened portion surrounding the shaft with radial clearance and having their ends formed with sockets in which said spigots on the discs engage.

2. A rotor for an axial flow compressor, turbine, or like bladed fluid flow machine comprising a shaft; at least two coaxial axially spaced blade-carrying rotor discs having axial bores through which the shaft extends with radial clearance, the discs being formed with axially extending central spigots on their adjacent faces; an elongated sleeve between the discs axially surrounding the shaft, said sleeve having intermediate its ends a radially thickened portion which is capable of substantially resisting radial expansion under centrifugal loading with an axial bore engaging with the shaft with an interference fit, and thin-walled tubular axial extensions from each side of the thickened portion, surrounding the shaft with radial clearance and having their ends formed with sockets in which said spigots on the discs engage, said extensions and sockets being elastically deformable in a radial sense to permit radial expansion of the discs and their spigots.

3. A rotor according to claim 2 wherein the radially thickened portion of the sleeve is of such radial dimensions as to be capable of substantially resisting radial expansion under centrifugal loading.

4. A rotor according to claim 2 wherein the disc spigots are an interference fit in the sockets.

5. A rotor according to claim 2 wherein the ends of the sleeve extensions and the faces of the rotor discs are formed with interengaging driving dogs.

6. A rotor for an axial flow compressor, turbine, or like bladed fluid flow machine comprising a shaft; a plurality of coaxial, axially spaced blade-carrying rotor discs having axial bores through which the shaft extends with radial clearance, each disc being formed with axially extending central spigots on both faces; an elongated sleeve between each pair of adjacent discs coaxially surrounding the shaft, each said sleeve having intermediate its ends a radially thickened portion with an axial bore engaging with the shaft, and thin-walled tubular axial extensions from each side of the thickened portion surrounding the shaft with radial clearance and having their ends formed with sockets in which the spigots on the adjacent disc faces engage; two further thin-walled sleeves coaxial with the shaft and one extending axially away from the outer face of each end disc, said sleeves being each formed at one end with sockets in which the spigots on the outer faces of said end discs engage; and means rigidly securing the other ends of said further sleeves to the ends of the shaft.

7. A rotor according to claim 6 further comprising an outward annular extension from each end of the shaft and rigidly secured thereto, said other ends of the further sleeves being rigidly secured to said extensions.

8. A rotor according to claim 6 wherein all the ends of the sleeves and all the faces of the rotor discs are formed with interengaging driving dogs except for those on one side of one of the discs intermediate the ends of the rotor.

References Cited in the file of this patent

UNITED STATES PATENTS

| 2,741,454 | Eppley | Apr. 10, 1956 |

FOREIGN PATENTS

| 536,363 | Germany | Nov. 3, 1931 |
| 854,604 | Germany | Nov. 6, 1952 |
| 887,689 | Germany | Aug. 27, 1953 |